United States Patent
Marsacq et al.

(10) Patent No.: US 7,569,289 B2
(45) Date of Patent: Aug. 4, 2009

(54) FUEL CELL COMPRISING A MAGNETIC CATHODE WITH STATIC PUMPING

(75) Inventors: Didier Marsacq, Grenoble (FR); Christine Nayoze, Fontaine (FR); Christel Roux, Saint-Quentin-sur-Isère (FR); Alejandro Franco, Echirolles (FR)

(73) Assignee: Commissariat a l'Energie Atomique, Paris (FR)

( * ) Notice: Subject to any disclaimer, the term of this patent is extended or adjusted under 35 U.S.C. 154(b) by 774 days.

(21) Appl. No.: 10/535,402
(22) PCT Filed: Dec. 2, 2003
(86) PCT No.: PCT/FR03/03558

§ 371 (c)(1), (2), (4) Date: Jun. 2, 2005

(87) PCT Pub. No.: WO2004/054018
PCT Pub. Date: Jun. 24, 2004

(65) Prior Publication Data
US 2006/0035117 A1    Feb. 16, 2006

(30) Foreign Application Priority Data
Dec. 4, 2002    (FR) .................................. 02 15253

(51) Int. Cl.
H01M 2/00    (2006.01)
H01M 8/10    (2006.01)

(52) U.S. Cl. ......................................... 429/10; 429/30
(58) Field of Classification Search .................... 429/10
See application file for complete search history.

(56) References Cited

U.S. PATENT DOCUMENTS 5,928,804 A * 7/1999 Leddy et al. .................. 429/10

2002/0012821 A1    1/2002 Leddy et al.

FOREIGN PATENT DOCUMENTS

| JP | A 61-91876 | 5/1986 |
| JP | A 2001-205078 | 7/2001 |
| JP | A 2002-198057 | 7/2002 |

OTHER PUBLICATIONS

Wakayama et al.; "Magnetic Promotion of Oxygen Reduction Reaction with Pt Catalyst in Sulfuric Acid Solutions"; Japanese Journal of Applied Physics, Part 2, No. 3B, vol. 40, pp. 269-271; XP-001154940; Mar. 15, 2001.

Okada et al.; "The Effect of Magnetic Field on the Oxygen Reduction Reaction and its Application in Polymer Electrolyte Fuel Cells"; Electrochimica Acta, vol. 48, No. 5, pp. 531-539; XP-004401305; Jan. 15, 2003.

* cited by examiner

Primary Examiner—Dah-Wei D Yuan
Assistant Examiner—Maria J Laios
(74) Attorney, Agent, or Firm—Oliff & Berridge, PLC

(57) ABSTRACT

The fuel cell, generating electric power from oxygen and hydrogen ions and comprising an anode (A), a magnetic cathode, comprising an active layer (2), and a proton electrolyte (1) between the anode and the cathode, comprises a network (3) of permanent magnets (4) designed to increase the diffusion of oxygen in the active layer. The centers of the magnets (4) of the network (3) of permanent magnets are preferably arranged with a two-dimensional distribution in a plane arranged at the interface between the electrolyte (1) and the active layer (2), the magnets being magnetized in parallel manner along the axis perpendicular to this plane. In this way, all the poles of one polarity (S) are surrounded by the active layer (2), all the poles of opposite polarity (N) being surrounded by the electrolyte (1).

8 Claims, 3 Drawing Sheets

FUEL CELL COMPRISING A MAGNETIC CATHODE WITH STATIC PUMPING

BACKGROUND OF THE INVENTION

The invention relates to a fuel cell generating electric power from oxygen and hydrogen ions, and comprising an anode, a magnetic cathode comprising an active layer, a proton electrolyte between the anode and the cathode, and a network of permanent magnets having magnetic axes perpendicular to the interface between the electrolyte and the active layer, the magnets comprising a first pole and a second pole.

STATE OF THE ART

Fuel cells are constituted by an anode and a cathode separated by a liquid or polymer electrolyte. For certain applications, in particular power supply of portable electronic devices, one of the fuels is the oxygen of the air. The performances of such a system are limited essentially by the cathode and in particular by the quantity of oxygen accessible at the level of the catalyzer. The use of a conventional pumping system increasing the oxygen flow at the level of the cathode is costly in energy, the associated performance increase then being compensated by the energy consumed by the pumping system.

It would be interesting to make the fuel cell operate by using the oxygen present in the ambient air to the maximum without a mechanical pumping system. A solution called "static pumping" has been proposed, using the paramagnetic properties of oxygen. Static pumping is based on the force exerted on a paramagnetic object by a magnetic field in which it is situated. In a magnetic field this force attracts the paramagnetic object in the direction in which the absolute value of the magnetic field increases.

The article "Magnetic Promotion of Oxygen Reduction Reaction with Pt Catalyst in Sulfuric Acid Solutions" by N. I. WAKAYAMA et Al. proposed improving the operation of a fuel cell by static pumping (Jpn. J. Appl. Phys. Vol. 40 (2001) pp. L269-L271) by incorporating a powder of small magnetic particles in an active layer between a membrane and a diffusion electrode. However, this solution has a very small effect, because the magnetic particles are distributed in random manner over the whole thickness of the active layer.

The document JP 2002/198,057 describes a fuel cell comprising permanent magnets dispersed in one of the electrodes of a fuel cell. The magnets can be arranged in a network and the orientations of the permanent magnets are uniform and parallel to a line connecting the electrodes.

Consequently, in the two above-mentioned documents, the resulting magnetic force is reduced in the points of the space where the magnetic fields of several particles or magnets are opposed. The oxygen is not attracted by the magnetic forces to penetrate into the whole volume of the active layer. The operation of the active layer is then improved on the surface only, whereas the operation within the volume remains weakened.

Another drawback of small magnetic particles is the large corrosion of the magnetic material in an acid or even alkaline medium depending on the type of cell envisaged.

OBJECT OF THE INVENTION

The object of the invention is to remedy these shortcomings and in particular to increase the quantity of oxygen accessible at the level of the whole of the catalyzer of the active cathodic layer.

According to the invention, this object is achieved by the accompanying claims and more particularly by the fact that the first and second poles of the magnets of the network are respectively arranged in an active layer and in the electrolyte.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
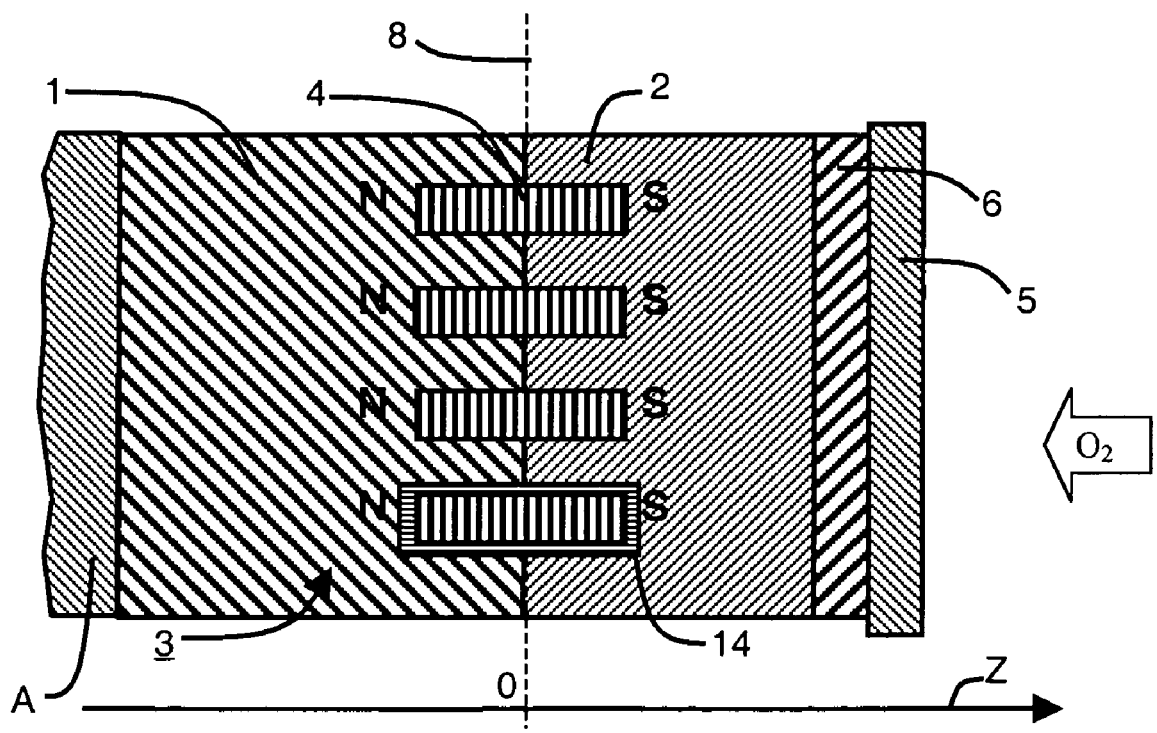
FIG. 1 is a representation of an embodiment of a fuel cell according to the invention.

FIG. 1 represents a fuel cell comprising an anode A, a proton electrolyte 1 and a magnetic cathode comprising an active layer 2, a porous electric current collector plate 5 and a diffusion layer 6. The oxygen arriving from the right passes through the collector plate 5 and the diffusion layer 6 of the cathode and enters the active layer. The hydrogen comes in the form of hydrogen ions ($H^+$), borne by a compound able to be a hydrogen vector (alcohol, sugar, nitrogenated compound, etc. . . . ).

To increase the diffusion of the oxygen entering the active layer 2, the cathode comprises a network 3 of permanent magnets 4 having magnetic axes perpendicular to the interface between the electrolyte and the active layer.

In a preferred embodiment, the centers of the magnets 4 of the network 3 of permanent magnets are arranged with a two-dimensional distribution. In FIG. 1, this two-dimensional distribution is localized in the plane parallel to the interface between the electrolyte 1 and the active layer 2. The magnets 4 are preferably magnetized along the axis z perpendicular to the plane of the two-dimensional distribution so that all the north polarity poles N are in one plane and all the south polarity poles S are in a parallel plane. In this way, first poles S of the magnets 4 of the network 3 are arranged in a first plane parallel to the interface between the electrolyte 1 and the active layer 2 and second poles N of the magnets 4 of the network 3 are arranged in a second plane parallel to the interface between the electrolyte 1 and the active layer 2.

In a preferred embodiment, the permanent magnets 4 are semi-surrounded by the active layer 2 so that all the poles (S) of the same polarity are surrounded by the active layer 2, all the poles of opposite polarity (N) being surrounded by the electrolyte 1. In this way, the first and second planes are respectively arranged in the active layer 2 and in the electrolyte 1. In the embodiment represented in FIG. 1, the interface between the electrolyte 1 and the active layer 2 is arranged substantially at equal distance from the first and second planes. The permanent magnets 4 preferably have identical shapes and identical spatial orientations, as represented in FIG. 1.

In the embodiment represented in FIG. 1, the interface between the electrolyte and the active layer is situated on a vertical axis 8 and the magnets are magnetized along a horizontal axis z. The magnets then create a magnetic field, the absolute value whereof is maximal on the vertical axis 8. A magnetic force F(z) attracts the oxygen to the vertical axis 8.

Figure 2:
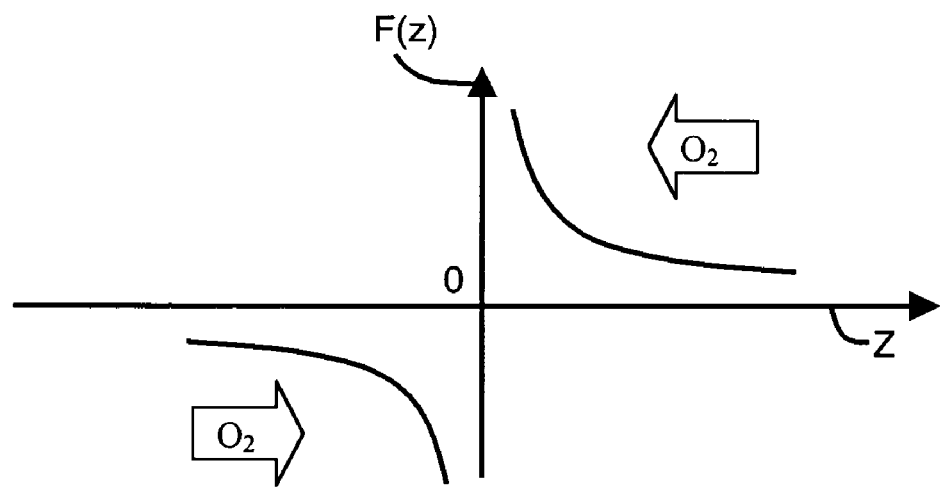
FIG. 2 illustrates the variations of the magnetic force inside the cell.

In FIG. 2, the magnetic force F(z) is illustrated as a function of the coordinate on the horizontal axis z. The force F(z) increases when the vertical axis 8 is approached and changes sign precisely on the vertical axis 8, corresponding to a change of direction of the force. On the left part of the axis 8, the oxygen is then attracted to the right, whereas on the right part of the axis 8, the oxygen is then attracted to the left.

The electrochemical reaction with the oxygen takes place in the entire active layer 2. This layer therefore has to be located in the region where the oxygen concentration is at the maximum. The oxygen coming from the diffusion zone 6 is attracted into the whole volume of the active layer by the magnets. On the other hand, in the electrolyte, the oxygen is repelled towards the active layer so that the oxygen concentration in the electrolyte is reduced. Insertion of the magnets partially in the active layer and partially in the electrolyte is optimized by the distribution of the magnets 50% in the active layer and 50% in the electrolyte.

Figure 3:
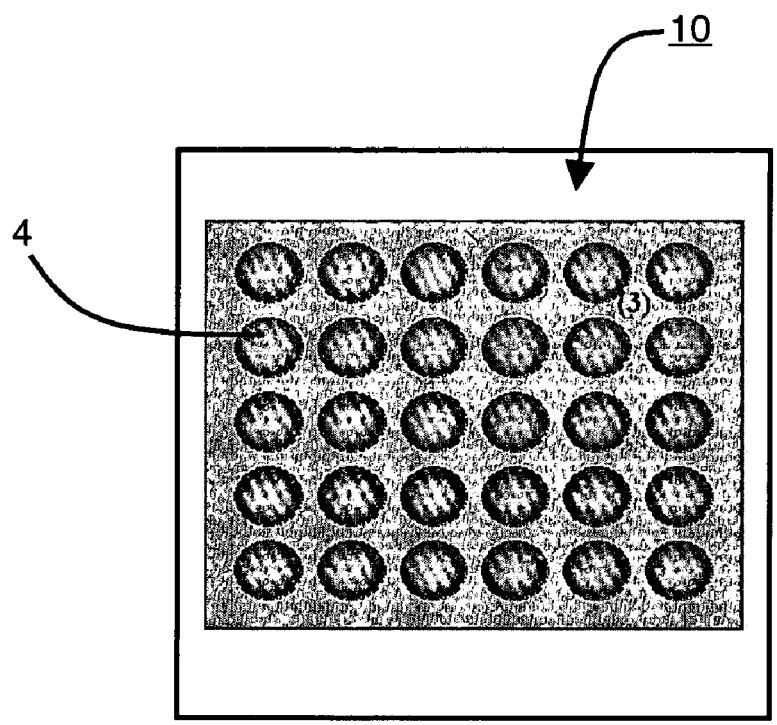
FIGS. 3 and 4 are cross-sectional views along the vertical axis 8 of different embodiments of the cell according to FIG. 1.

With reference to FIG. 3, the network of permanent magnets can be formed by cylindrical magnets 4 arranged in a two-dimensional distribution of a periodic network 10.

Figure 4:
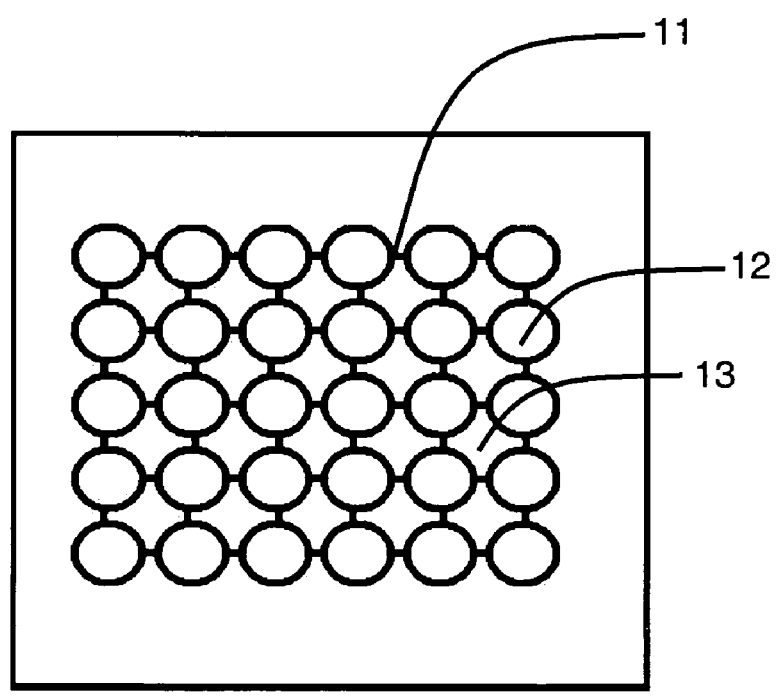

As represented in FIG. 4, the cell can comprise a support network 11 comprising apertures 12 wherein the magnets 4 can be arranged. The support comprises passages 13 for the ions, in particular the hydrogen ions coming from the electrolyte, between the magnets. The passages 13 are therefore triple point zones where the hydrogen ion H$^+$, oxygen O$_2$ and electron elements are in presence, which gives rise to the electrochemical reaction. The material of the support network 11 can be a non-magnetic material. The support network can be fixed onto the electrolyte 1 or arranged at the interface between the electrolyte 1 and the active layer 2.

The performance of this improved oxygen diffusion system by a network 3 of magnets 4 depends on the variation of several parameters: the magnetization, the geometry and number of magnets 4, the thickness of the cathode and the geometric distribution of the magnets 4 and of the passages 13 for the hydrogen ions. In this way, with a flat periodic distribution of the centers of the masses of the magnets 4, as in FIG. 3, a uniform improvement of the gas diffusion in the catalyzer is obtained. Other flat geometries, for example triangular or fractal, can also be envisaged.

Figure 5:
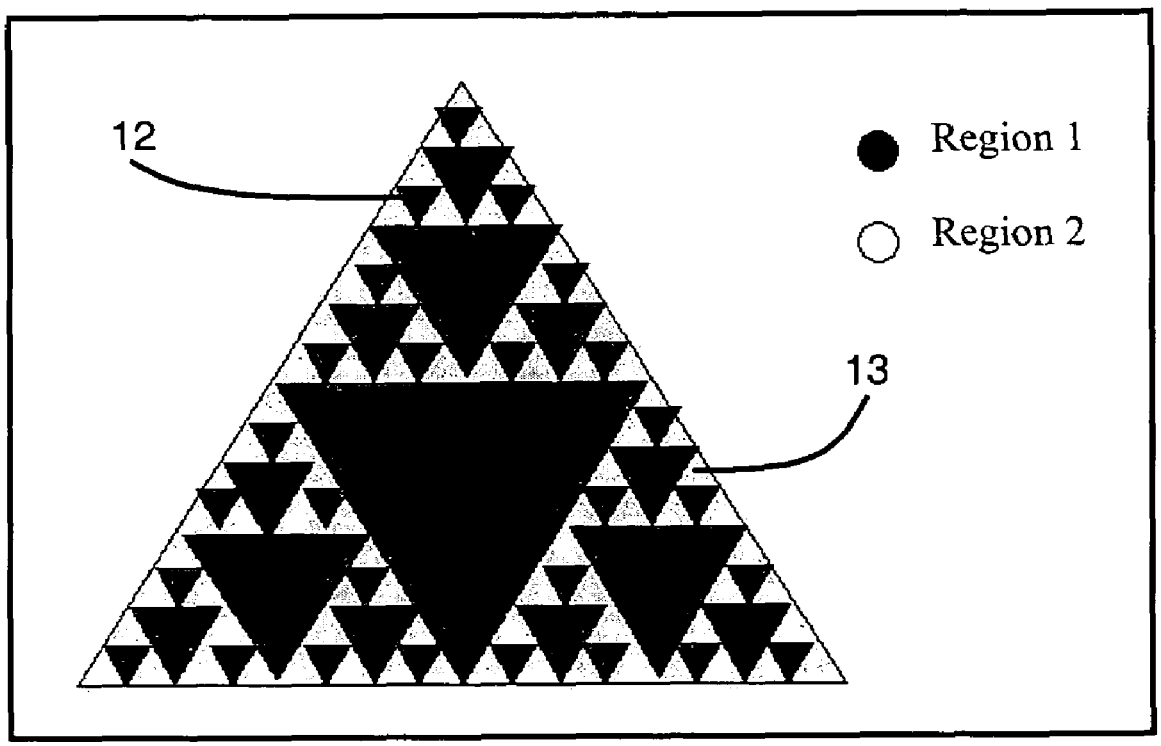
FIG. 5 schematically represents the symmetry of another particular embodiment of a network of permanent magnets.

As represented in FIG. 5, a distribution of the apertures 12 for placing the magnets 4 and of the passages 13 in the support network 11 can constitute a fractal structure, represented by triangles of different dimensions, a relatively large triangle being surrounded by smaller triangles. The centers of the triangles of FIG. 5 represent the centers of the magnets. The individual shape of the magnets themselves is not necessarily triangular.

In order to prevent corrosion of the magnets 4 in the electrolyte 1 (acid or alkaline), the magnets 4 can be treated against corrosion or comprise anti-corrosive coatings (in FIG. 1, one of the magnets is represented with an anti-corrosive coating 14). The anti-corrosion treatment depends on the nature of the electrolyte 1. The material of the coating is typically platinum or gold.

The network 3 of permanent magnets 4 can comprise magnets 4 made of ferromagnetic material. For example, the permanent magnets 4 can be made from materials forming part of the SmCo, AlNiCo, NdFeB or Ferrite families. However, any magnetic metals and alloys are envisageable.

The best performances are obtained if the magnets 4 are very close to the oxygen, i.e. on the cathode side. However, an optimum oxygen diffusion throughout the cathode is obtained with the embodiment of FIG. 1 wherein the centers of the magnets 4 are located on the interface between the active layer 2 of the cathode and the electrolyte 1. The magnetic forces increase quickly when the distance between the magnets 4 and the oxygen decreases. In this way, the network 3 of magnets 4 operates as a filter of the oxygen in the air, privileging oxygen over the other gases present in the air.

The permanent magnets 4 constitute an ideal magnetic field source, operating alone, without an additional external energy input.

The invention is more particularly suited to fabrication of mini-fuel cells. The network 3 of magnets 4 enables a sufficient magnetic force to be produced at a distance of a few millimeters from the active layer 2. This enables a reduction of the overpotential of the oxygen reduction reaction to be obtained, as indicated by the following example: in the case of a fuel cell comprising a solid polymer electrolyte with a cathode with a thickness of about 250 μm and a resulting magnetic field of the magnets of $10^{-6}$ teslas, a decrease of the diffusion overpotential of about 10% to 20% can be forecast.

The invention claimed is:

1. Fuel cell, generating electric power from oxygen and hydrogen ions, and comprising an anode, a magnetic cathode comprising an active layer, a proton electrolyte between the anode and the cathode, and a network of permanent magnets, each magnet having a magnetic axis perpendicular to and crossing a plane of interface between the electrolyte and the active layer, the magnets comprising a first pole and a second pole, and wherein the first and second poles of the magnets of the network are respectively arranged in the active layer and in the electrolyte.

2. Fuel cell according to claim 1, wherein the interface between the electrolyte and the active layer is arranged substantially at equal distance from the first and second poles of the magnets.

3. Fuel cell according to claim 1, comprising a support network, comprising apertures wherein the magnets are arranged, and passages for the hydrogen ions and the oxygen.

4. Fuel cell according to claim 3, wherein the support network is made of non-magnetic material, fixed onto the electrolyte.

5. Fuel cell according to claim 1, wherein the magnets comprise an anti-corrosive coating.

6. Fuel cell according to claim 5, wherein the anti-corrosive coating is made of platinum or gold.

7. Fuel cell according to claim 1, wherein the magnets are distributed in a plane parallel to the interface between the electrolyte and the active layer with a periodic distribution.

8. Fuel cell according to claim 1, wherein the magnets are distributed in a plane parallel to the interface between the electrolyte and the active layer with a fractal type distribution.

\* \* \* \* \*